United States Patent [19]

Börner

[11] 4,116,498
[45] Sep. 26, 1978

[54] TRACK CONSTRUCTION FOR TRACKED LAND VEHICLES SUCH AS TANKS

[75] Inventor: Hans G. K. Börner, Blieskastel-Mimbach, Fed. Rep. of Germany

[73] Assignee: Gerlach-Werke GmbH, Fed. Rep. of Germany

[21] Appl. No.: 726,111

[22] Filed: Sep. 24, 1976

[30] Foreign Application Priority Data

Dec. 6, 1975 [DE] Fed. Rep. of Germany ....... 2554981

[51] Int. Cl.² ............................................. B62D 55/20
[52] U.S. Cl. ............................... 305/58 R; 305/58 PC
[58] Field of Search ................... 305/58 R, 58 PC, 59, 305/41, 42, 39, 53

[56] References Cited

U.S. PATENT DOCUMENTS

| | | | |
|---|---|---|---|
| 2,283,936 | 5/1942 | Knox | 305/42 |
| 2,301,954 | 11/1942 | Knox | 305/42 |
| 2,536,064 | 1/1951 | Knox | 305/59 |
| 3,721,476 | 3/1973 | Andersson | 305/58 X |

FOREIGN PATENT DOCUMENTS 1,680,325 10/1973 Fed. Rep. of Germany ........ 305/58 R Primary Examiner—Robert B. Reeves
Assistant Examiner—John P. Shannon
Attorney, Agent, or Firm—Larson, Taylor and Hinds

[57] ABSTRACT

A track construction is provided for tracked vehicles such as tanks which comprise alternate track members and connection members which are connected together by transverse connecting pins. The track members comprise first and second spaced, parallel sets of transversely extending tubular members connected together by a bridging member, the tubular members of each set being axially aligned and spaced apart to form gaps therebetween. The upper surfaces of the bridging members contact the wheels of the vehicle while ground-contacting pads are mounted on the track members on the opposite side thereof from the wheel contacting surfaces. The connection members also include wheel contacting surfaces and engage the connecting pins at locations between the gaps defined by the tubular members. The wheel contacting surfaces of the bridging portions of the track members are recessed at these locations and portions of the wheel contacting surfaces of the connection members project into the gaps.

14 Claims, 9 Drawing Figures

TRACK CONSTRUCTION FOR TRACKED LAND VEHICLES SUCH AS TANKS

Field of the Invention

The present invention relates to a track or a track construction for tracked land vehicles such as tanks, armored cars and the like.

Background of the Invention

In one form of conventional tracks used for tanks and the like, the track construction includes so-called "double tube" or "double tubular" track members connected by transversely extending pins and by linking connectors being provided at the free ends of the pins. The track members include wheel contacting surfaces which engage the drive wheels of the vehicle. In accordance with such conventional track constructions, ground engaging pads are fixed to the underside of the track members the mass of the ground engaging pads filling the cavity defined by what is a substantially box-shaped body portion of the track member. An improved track construction is disclosed in U.S. Pat. No. 3,591,242 (Borner). A track construction of this kind includes connection members between the track members connected with the track members by transversely extending pins. The tubes of the track members receive rubber sleeves and therein receive the connecting pins and the latter directly engage the connecting members, the rubber sleeves providing the required pivotable connection between the track members and the connecting members. The ground engaging pads fixed to the underside of the track members extend in both longitudinal directions of the track beyond the two connecting pins of the track member. A track of this kind provides particular advantages with regard to riding smoothness. In particular, whereas in previous track constructions, the drive wheels of the vehicle, in transition from one track member to the other, caused bending of the ground engaging pads and thus themselves were caused to sink in, the track of the Borner patent, through the provision of a bridging action whereby the connecting members also include wheel contacting surfaces and bear on the connection pins at a location nearer the centerline of the pads, affords a relatively even ride over the entire length of the track. However, in this construction, the shocks on the wheels at the lateral edges of the wheel engaging surfaces of the individual track member are quite noticeable whereas, in previous track constructions, these shocks were masked or muted in the greater overall roughness of operation which is characteristic of such prior art constructions. Such shocks are susceptible of generating vibrations and of providing a harmful effect on the operation of the electronic equipment carried by the tracked vehicles. More specifically, this effect is particularly noticeable with respect to aiming instruments such as gunsights and the like, the reticle lines used for alignment becoming blurred into bands as a result of the vibrations produced.

SUMMARY OF THE INVENTION

The present invention is particularly concerned with the problem of providing even smoother operation as is provided by the track of the Borner patent whereby shock generated vibrations such as those discussed above are greatly reduced. Generally speaking, in accordance with the invention, a track of the type described above is provided wherein the connecting members engage the connection pins in gaps between the tubes of the track members and wherein the wheel engaging surfaces of the track members are recessed in the area of the gaps and the wheel engaging surfaces of the connecting members project into the gaps of this area.

As a result of this arrangement, the forward, leading edges of the wheel engaging surfaces of the connecting bodies are located in proximity to the forward leading edges of the wheel engaging surfaces of the track member, without either of the members hindering the movement of the other. On the other hand, this approximation of the edges is operative for the operating wheel which, as a rule, is wider than the recess and thus runs on or engages the one wheel contacting surface, without being effected by recesses in this surface, as far as the front edge or, respectively, from the front edge, and engages the other wheel contacting surface at the forward leading edge or, respectively, as far as the forward leading edge. The effective gap or spacing between the wheel contacting surface of the track member and the wheel contacting surface of the connecting member is thereby reduced. Advantageously, the wheel contacting surfaces of the connecting members project outwardly to the forward leading edge of the wheel contacting surfaces of the adjacent track member so as to be in lateral axial alignment therewith, thus meaning that the gap between the wheel contact surfaces of the two members experienced by the wheels is effectively eliminated. Preferably, the connecting members engage the pins at each of two wheel contacting areas of the track and additional connections to the pins are provided at both ends of the pins. These latter connections may be accomplished by conventional connectors which serve to connect the ends of the pins of adjacent track members. Thus, the pins are interconnected at at least four points and, where an additional connection is provided in the middle, at five points.

The arrangement described above provides the further advantage over prior art tracks wherein the pins are connected with the next track member only at the ends thereof, or at the ends and in the middle, in that the forces acting on the pins are distributed more evenly and the pins are exposed to less bending stress. Thus, even where pins of smaller dimensions are used, and consequently the other parts are of smaller size, substantially greater tensile stresses can still be absorbed. The arrangement also enables the use of two connecting areas in the two wheel contacting surfaces.

Preferably, the track members and the connecting members are both continuous with respect to the track cross section. However, it is possible in principle at least to provide that one of the members consists of a plurality of individual elements distributed over the cross section of the track.

According to an advantageous embodiment of the invention, the connecting members consist of upper and lower parts which are clampingly bolted together onto the pins. The lower parts can also be provided separately for the different connecting locations. In order to accomplish the receipt of the pins in the tubes of the track members without any play therebetween, the pins are advantageously seated directly in resilient sleeves. The absolute freedom from play of such pin bearings, as opposed to tracks such as discussed above, wherein the pins are removable and thus must be seated inside the rubber sleeves with a certain unavoidable amount of play in metallic sleeves, is important insofar as this secures the evenness and smoothness of the wheel path obtained by the invention. Moreover, this clamping arrangement of the connecting members reduces wear and provides advantages with respect to the location of a track guide tooth on the connecting members.

In accordance with a further important aspect of the invention, the d-istance from pin to pin is greater through the track member than through the connecting member and a sprocket hole for engaging the teeth of the track drive sprockets can be provided between the ends of the pins at the sides of the track member. Because of this, the track members are wider than those of the tracks discussed above and the pads that are mounted thereon are also wider in the longitudinal direction of the track, so that the base area of the track is enlarged. In addition, with this arrangement, the distances between the track members may be dimensioned so as to permit the location of thrust bearings for removing the above mentioned connectors near the outer edges of the track members in opposed relationship on the sides of the track members that face each other.

Other features and advantages of the invention will be set forth in, or apparent from, the detailed description of a preferred embodiment found hereinbelow.

DESCRIPTION OF THE PREFERRED EMBODIMENT

Figure 1:
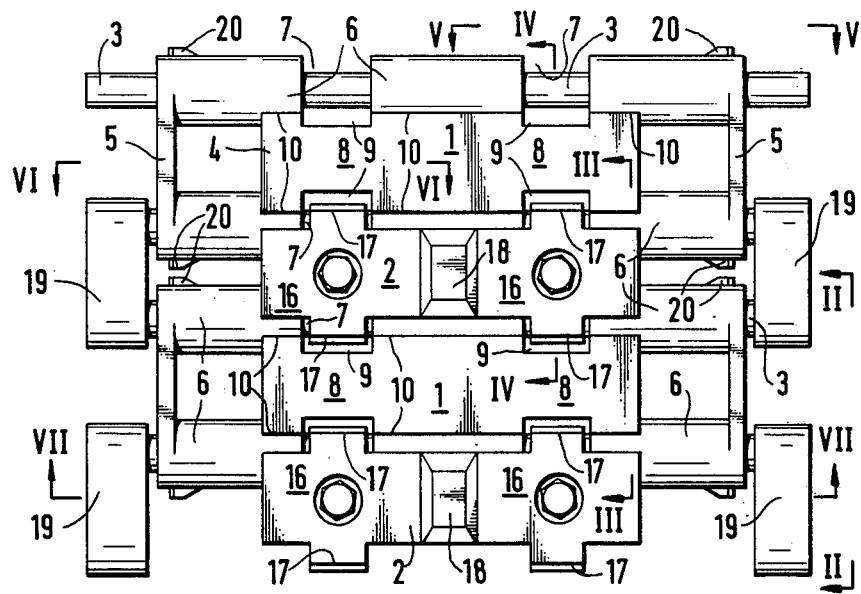
FIG. 1 is a plan view of a track constructed in accordance with a preferred embodiment of the invention, showing two track members and two connecting members.
Figure 5:
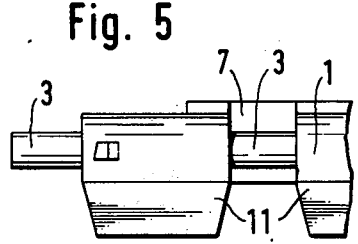
FIG. 5 is a end elevational view taken generally in the direction of arrows V—V of FIG. 1.

Referring to FIG. 1, a track construction in accordance with the invention includes, from the top, as viewed in FIG. 1, a first track member 1, a connecting member 2, a further track member 1, and a further connecting member 2. Track members 1 and connecting members 2 are interconnected in a manner described in more detail hereinbelow through mutual engagement and by means of transversely extending connection pins 3.

Figure 6:
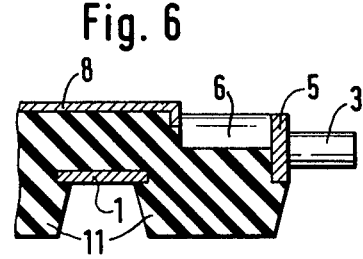
FIG. 6 is a sectional view taken generally along line VI—VI of FIG. 1.
Figure 4:
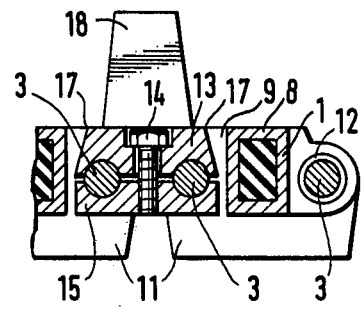
FIG. 4 is a sectional view taken generally along line IV—IV of FIG. 1.
Figure 3:
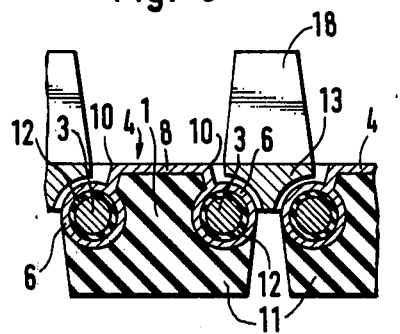
FIG. 3 is a sectional view of the track construction of FIG. 1 taken generally along line III—III of FIG. 1.

Track members 1 consist of first and second pairs or sets of parallel tubular members or tubes 6, the sets being connected to each other by a central bridging member or bridge 4, and first and second lateral connecting bars 5. Each set of tubes 6 comprises three tubes which are in axial alignment and which are spaced apart to form discontinuities or gaps 7. Thus, track members 1 are of the "double tube" or "dual tube" type comprising a pair of three, equal length, mutually aligned tubes 6 having gaps 7 formed therebetween. Bridge 4 includes wheel contacting surfaces 8 on opposite sides of the centerline of the track construction. As illustrated, these wheel engaging surfaces include recesses 9 in the area of gaps 7, the wheel contacting surfaces 8 being recessed in these areas with respect to the outermost edges 10 thereof. On the opposite side of track members 1 are three pads denoted 11, the resilient mass of these pads being anchored in cavities formed in the substantially box-like body portion of track member 1, as illustrated in FIGS. 3, 4 and 6. Resilient sleeves 12, preferably constructed of rubber or the like, surround pins 3 and the pins 3 and surrounding sleeves 12 are received in the bores formed by tubes or tubular members 6. Sleeves 12 are clampingly seated in tubes 6 while pins 3 are clampingly seated in sleeves 12.

Figure 7:
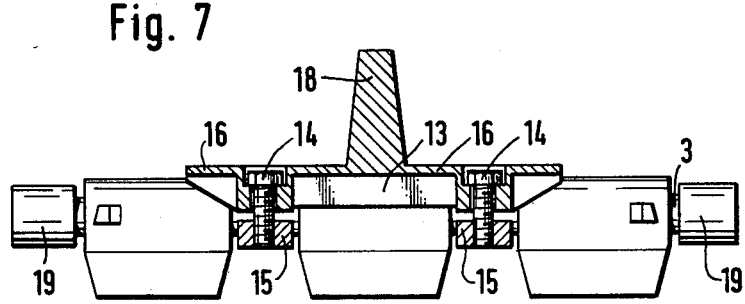
FIG. 7 is a sectional view taken generally along line VII—VII of FIG. 1.
Figure 2:
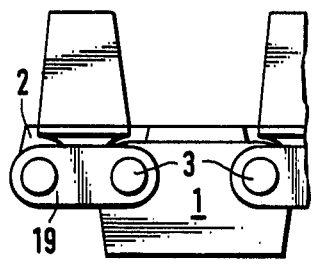
FIG. 2 is a side elevational view taken generally in the area of arrows II—II of FIG. 1.

Connecting members 2 basically comprise a first, upper part 13 and first and second lower parts 15 which are fixed thereto by bolts 14 (see FIG. 7). As illustrated in FIG. 4, upper part 13, and lower parts 15, are recessed to mate with the reciprocally shaped surfaces of pins 3 and are clampingly affixed thereto by bolts 14. In order to provide engagement between connecting members 2 and pins 3, the latter extend into the gaps 7 between the tubes of the track members 1. Connecting members 2 include wheel contacting surfaces 16 located on opposite sides of the center line of the track. Portions of the wheel engaging surfaces project outwardly therefrom so that the outer edges 17 are in lateral alignment with the outermost edges 10 of the wheel engaging surfaces 8 of the adjacent track member 10, as illustrated in FIG. 1. The spacing in the gap 7 between the forward edges 17 of the wheel contacting surfaces 16 of connecting members 2 and the innermost edges of the wheel engaging surfaces 8 which define recesses 9 of track member 1 is the same as the spacing between the forward edges 10 of the wheel engaging surfaces 8 and the opposite edges of the wheel engaging surfaces 16 of connecting members 2. This relationship is also illustrated in FIG. 1, and as shown in that figure, the latter edges of the wheel engaging surfaces 16 are located approximately over the longitudinal axes of pins 3. The central or middle portion of upper part 13 of connecting members 2 includes a track guide tooth 18 which projects upwardly therefrom (see e.g., FIGS. 1 and 7).

The pins 3 extend beyond the ends of track members 1, as illustrated, and the ends of pins of adjacent track members are connected together by conventional connectors 19 which are disposed in parallel, with the corresponding connecting members 2 located between the track members. Shoulders 20 located on track members 1 near the lateral edges thereof in opposed relationship serve as thrust bearings for removing the connectors 19 (see FIG. 1).

The track construction described above is mounted on the vehicle in a customary manner. The operating wheels of the vehicle contact the track at locations to the left and right of the track guide teeth 18 on wheel contacting surfaces 16 of connecting members 2 and at corresponding locations on wheel engaging surfaces 8 of track members 2. As, for example, the wheels roll over the forward edges 17 of the wheel contacting surfaces 16, they instantly contact the forward or outermost edges 10 of the wheel contacting surfaces 8 of the track members 1. The wheels first contact these surfaces with only the outer sections of their axial length, i.e., with those portions which extend beyond the recessed portions of the wheel contacting surfaces 8 of track members 1. Similar conditions, of course, hold when a transition is made from the wheel contacting surfaces of a track member 1 to a connecting member 2. Track members 1 and connecting members 2, because of the resilience of rubber sleeves 12, can be deflected in a conventional manner with reference to one another. A sprocket drive is provided in a known way, the teeth engaging in the spaces between the connectors 19.

Figures 8, 9:
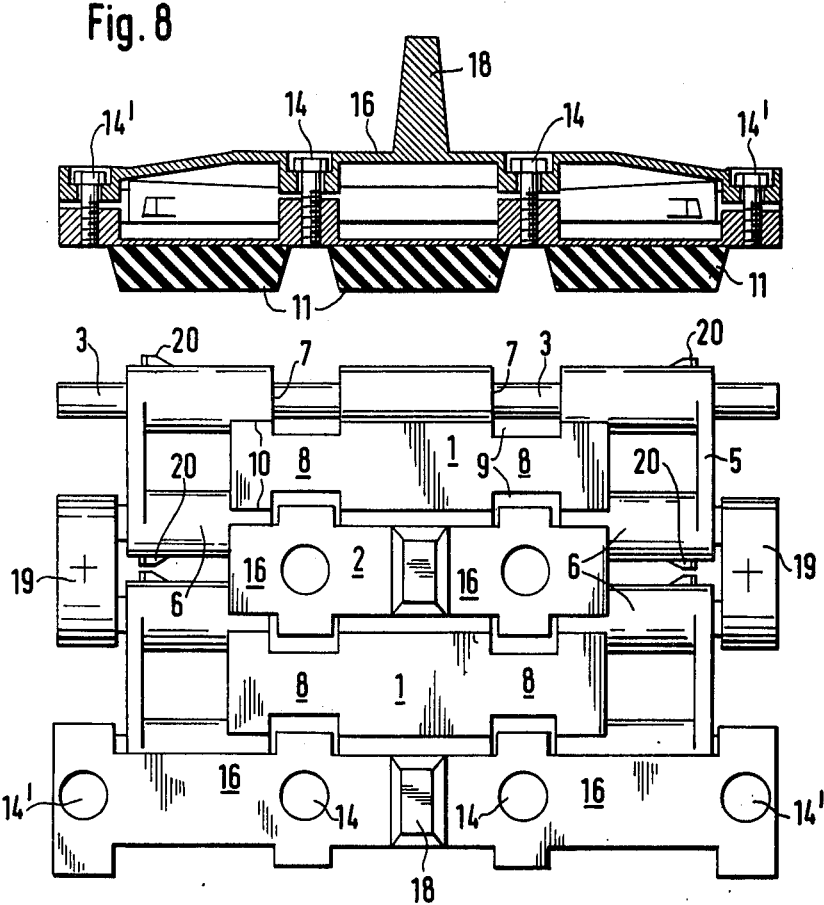
FIGS. 8 and 9 are sectional and plan views, respectively, of a track constructed in accordance with a further embodiment of the invention.

FIGS. 8 and 9 illustrate a further embodiment of the invention. In contrast to FIG. 4 wherein pin 14 is located in the middle of the track members, a plurality of pins 14 are provided including a pair of pins 14' located at the lateral end portions of the track members.

Although the invention has been described relative to exemplary embodiments thereof, it will be understood that other variations and modifications can be effected in these embodiments without departing from the scope and spirit of the invention.

I claim:

1. A track construction for land vehicles, such as tracked armored vehicles, said track construction comprising:
   a plurality of track members each comprising first and second spaced parallel sets of transversely extending tubular members, said sets each comprising at least two tubular members mounted in axially spaced relationship so as to define a gap therebetween and having axially aligned bores therein, said track members each including a wheel contacting surface located on one side thereof and a ground engaging pad member located on the other side thereof and extending in both longitudinal directions of the track beyond the two connecting pins of the connection member;
   a plurality of connection members each including a wheel contacting surface;
   and connecting means, including a pair of connecting pins extending through resilient sleeves mounted in said aligned bores of said sets of tubular members, for connecting said connection members and said track members together in alternating relationship to form a track, said connection members engaging said connecting pins in gaps between said tubular members and the wheel contacting surfaces of said track members defining recesses in the areas of said gaps and portions of the wheel contacting surfaces of said connection members projecting into said gaps in the direction of said recesses.

2. A track construction as claimed in claim 1 wherein said recesses extend in the direction of travel of the tracks and the outermost edges of said projecting portions of said connection members extend into said gaps for a distance such that these edges are in transverse alignment with the outermost edges of the wheel contacting surfaces of the adjacent track members.

3. A track construction as claimed in claim 1 wherein said connection members engage said pins at one location in each of the two wheel contacting surfaces included on opposite sides of the center line of the track construction.

4. A track construction as claimed in claim 1 wherein said connection members engage said pins at two locations in each of the two wheel contacting surfaces included on opposite sides of the center line of the track construction.

5. A track construction as claimed in claim 1 wherein said connection members engage said pins at a location in the middle of said track members.

6. A track construction as claimed in claim 1 wherein said connection members engage said pins at the lateral end portions of the track members.

7. A track construction as claimed in claim 1 wherein said pins extend beyond the lateral ends of said track members, said track further comprising connectors for connecting the ends of the pins of two adjacent track members in parallel with the connection member disposed between those track members.

8. A track construction as claimed in claim 1 wherein said track members are continuous across the central portion of the cross-section of the track construction.

9. A track construction as claimed in claim 1 wherein said connection members are continuous across the central portion of the cross-section of the track construction.

10. A track construction as claimed in claim 1 wherein said connection members each include a guide tooth projecting upwardly therefrom.

11. A track construction as claimed in claim 1 wherein said connection members include first and second parts, and means for clampingly connecting said parts to said pins.

12. A track construction as claimed in claim 11 wherein said second parts comprise separate individual parts.

13. A track construction as claimed in claim 1 wherein said pins are directly seated in said resilient sleeves.

14. A track construction as claimed in claim 7 further comprising shoulders formed on opposed, facing end surfaces of adjacent track members and serving as a fulcrum for removing said connectors.

* * * * *